United States Patent Office 3,529,957
Patented Sept. 22, 1970

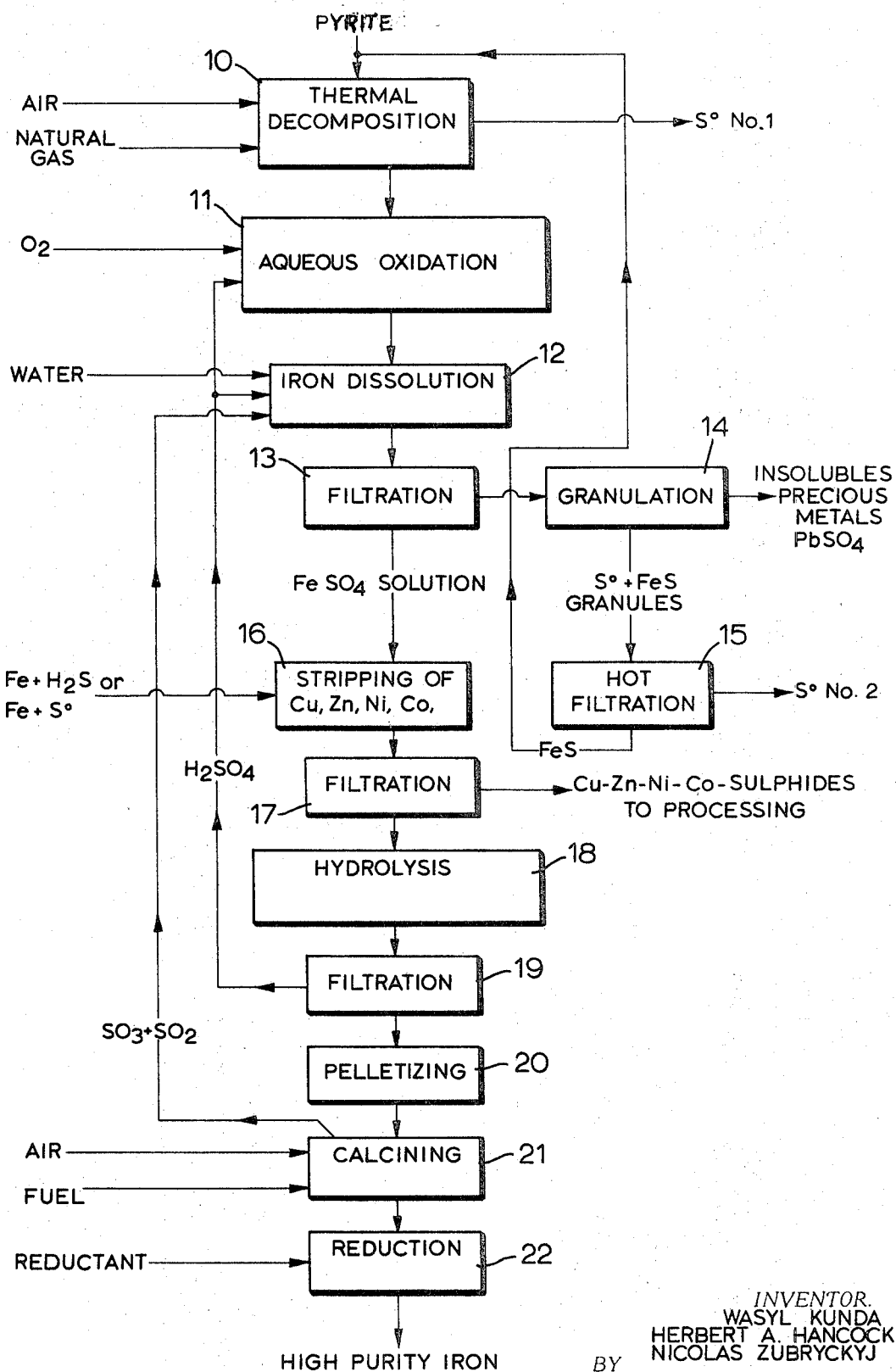

3,529,957
PRODUCTION OF ELEMENTAL SULPHUR AND
IRON FROM IRON SULPHIDES
Wasyl Kunda, Herbert Arthur Hancock, and Nicolas
Zubryckyj, Fort Saskatchewan, Alberta, Canada, assignors to Sherritt Gordon Mines Limited, Toronto,
Ontario, Canada, a company duly organized under the
laws' of the Province of Ontario
Filed Feb. 9, 1968, Ser. No. 704,298
Claims priority, application Canada, Aug. 25, 1967,
998,676
Int. Cl. C22b 3/00
U.S. Cl. 75—108        12 Claims

ABSTRACT OF THE DISCLOSURE

An improvement in the known aqueous oxidation method of treating iron sulphides whereby elemental sulphur and high purity iron are recovered as well as any desired non-ferrous metals associated with the sulphides. The sulphides are oxidized by reaction with oxygen in an aqueous medium at a temperature below about 245° F. The oxidation end slurry is treated in an iron dissolution reaction involving reaction of the slurry with $H_2SO_4$ and $SO_2$ to dissolve oxidized iron. The iron containing solution is separated from the residue and, after stripping of non-ferrous metals if present, is heated to hydrolyze dissolved iron and precipitate it as pure basic iron sulphate. Elemental sulphur is recovered from the residue.

---

This invention relates to the treatment of iron sulphides for the recovery of sulphur and iron. More particularly, it relates to an improved hydrometallurgical method for treating pyrrhotitic mineral sulphides to produce elemental sulphur and iron and, where the material contains non-ferrous impurities, to recover these as separate by-products.

Although there is an ever increasing world demand for both iron and sulphur, only a very small proportion of this demand is being met by iron and sulphur produced from iron sulphide ores. For example, in Canada in 1966 less than 1% of the total iron ore processed was pyrite and pyrrhotite and this despite a great abundance in Canada of these sulphide ores. This indicates a great need for economically sound processes for the universal treatment of sulphidic iron ores.

The processes now in commercial use for treating iron sulphides generally involve roasting in air to drive off sulphur. The iron oxide product is used for iron and steel production if it meets the purity specifications and the sulphur dioxide is used for sulphuric acid production. In one roasting process in commercial use, pyrrhotite containing non-ferrous impurities is dead roasted, the copper, nickel and cobalt are preferentially reduced to the metallic form and are extracted by leaching with ammonium carbonate solution. The leach residue (magnetite) is used as iron ore.

Still another commercial process involves flash melting of pyrite at about 2200° F. The product, liquid iron matte, is granulated and subsequently roasted to iron oxide and sulphur dioxide. About 90% sulphur recovery is obtained, partly as elemental sulphur and partly as sulphur dioxide.

A disadvantage of the prior art processes is that all or a substantial part of the sulphur content of the iron sulphide material treated is recovered as sulphur dioxide, and in the absence of a market for sulphuric acid, its disposal can be a problem. Conversion of the sulphur dioxide to elemental sulphur, which is more readily marketable, is generally uneconomic. Another disadvantage often encountered is that impurities in the iron sulphides do not enable the economic production of iron ore which meets the specifications set up by iron and steel users.

The problems of these prior art processes have, to some extent, been overcome by recently developed hydrometallurgical processes for producing sulphur from pyrrhotitic mineral sulphides. In one such process, described in U.S. Pat. No. 3,034,864, finely divided pyrrhotitic mineral sulphide ore or concentrate is slurried with water in an aqueous acid sulphate solution. The slurry is then reacted with a free oxygen bearing, oxidizing gas at a temperature within the range of from about 200° to about 290° F. and under a partial pressure of oxygen above about 25 p.s.i. The treatment is continued until sulphur in the mineral sulphides is oxidized to elemental form. Resulting elemental sulphur is then separated from the solids fraction of the slurry. Where the pyrrhotitic sulphides contain non-ferrous metal values such as copper, nickel, cobalt and zinc, these can be extracted by dissolution in the solution as metal sulphates and/or they can be recovered as a sulphide concentrate associated with the elemental sulphur product. (See, for example, U.S. Pats. Nos. 2,898,196 and 2,898,197.)

A serious disadvantage of these known hydrometallurgical processes is the difficulty in separating the oxidized iron fraction from the other constituents in the oxidation-end slurry. The oxidized iron compounds, including hydrated ferric oxide, produced in the aqueous oxidation reaction are in the form of an extremely fine slime. The separation of this material from the solution and from other non-sulphidic solids in the residue such as silica, precious metals and insoluble sulphates such as $PbSO_4$ presents serious technical problems which heretofore have not been satisfactorily resolved.

The present invention provides a simple method which overcomes these problems and which can conveniently be employed in conjunction with the known aqueous oxidation processes to effectively and economically treat a wide range of sulphidic iron ores and concentrates regardless of their impurity contents for the separate recovery of sulphur and iron. The method also permits the recovery of non-ferrous impurities such as copper, zinc, nickel, cobalt and precious metals as valuable by-products when these are present in the starting material.

The method of the invention constitutes an improvement in the known aqueous oxidation method of treating iron sulphides to produce elemental sulphur in which an aqueous slurry of finely divided pyrrhotitic mineral sulphides is contacted at a temperature below about 245° F. with a free oxygen bearing gas to convert iron values in the sulphides to oxidized compounds with concurrent conversion of sulphide sulphur associated with the iron values to elemental sulphur. The improvement involves subjecting slurry from the aqueous oxidation operation to an iron dissolution operation in which said slurry is reacted under non-oxidizing conditions with sulphuric acid and sulphur dioxide to dissolve oxidized iron compounds contained in said slurry, separating the solution with dissolved iron values from undissolved residue, heating the solution under oxidizing conditions to hydrolyze and precipitate the dissolved iron from solution as basic iron sulphate, recovering the basic iron sulphate precipitate such as by filtration and treating it to recover product iron.

This method enables the effective separation of the oxidized iron compounds from the other insolubles including gangue, sulphur, unoxidized sulphides and, if present in the starting material, lead and precious metals. The iron is recovered from the solution as crystalline basic iron sulphate compound which is easily separated from the solution by conventional liquids-solids separation procedures such as filtration or centrifuging. Where a high purity, iron product is desired, any non-ferrous impurities such as copper, zinc, nickel and cobalt present in the pyrrhotitic sulphides are separately recovered as by-products by precipitation from the solution prior to the iron hydrolysis step. The basic iron sulphate can be converted into sponge iron or pure iron powder by conventional methods.

The term "pyrrhotitic mineral sulphides" as used herein is intended to mean iron containing sulphides in which the molar ratio of sulphur to iron is less than about 1.5. This includes naturally occurring pyrrhotite, generally given the formula $FeS_x$ where $x = 1-1.5$, as well as so-called artificial pyrrhotite which is produced by thermal decomposition of pyrite ($FeS_2$). The primary object of the invention is to produce elemental sulphur and iron from such pyrrhotitic mineral sulphides. Therefore, the sulphides may be barren of economically recoverable non-ferrous metals. On the other hand, since the method of the invention permits effective recovery of non-ferrous impurities as by-products, the pyrrhotitic sulphide may contain non-ferrous impurities such as copper, zinc, gold, silver, members of the platinum group and cobalt, nickel cadmium and lead.

The method of the invention is described in detail herein-below by reference to the accompanying drawing which is a simplified flow scheme showing the principal steps in an overall pyrite treatment process which incorporates the improved method of the invention. It is to be understood that the invention is described in this context for illustrative purposes only and that it is not restricted in application to this particular material and operational procedure.

In the overall process illustrated, the feed material is pyrite containing non-ferrous impurities including copper, zinc, nickel, cobalt and precious metals. The pyrite is first subjected to a thermal decomposition operation 10 to drive off labile sulphur and produce an artificial pyrrhotite which is amendable to direct aqueous oxidation as described hereinbelow. In this operation, sufficient sulphur must be removed from the purite to lower the sulphur to iron molar ratio thereof to below 1.5 and preferably to between 1.3 and 1.0. The thermal treatment can be conducted with conventional apparatus in accordance with known methods. A preferred procedure is to roast the pyrite, after grinding to substantially 80% minus 200 mesh standard Tyler screen, in a rotary kiln at a temperature in the range of about 1200° F. to about 1500° F. Heating is effected by burning natural gas flowing through the kiln counter-current to the solids. Roasting is continued to remove 40 to 45% of the sulphur content of the pyrite. This sulphur, which is 85–100% in elemental form depending on process conditions, is recovered by conventional methods and constitutes the first elemental sulphur product of the overall process. The bulk of the arsenic and selenium are removed from the feed in the heating step; thus, elemental sulphur product therefrom normally will be contaminated with arsenic and/or selenium where these elements are present in the pyrite. These contaminants can be removed by known procedures, such as by lime treatment, to produce a high purity elemental sulphur product.

The artificial pyrrhotite (S/Fe molar ratio of 1.0 to 1.5) from the thermal decomposition operation 10 is treated in aqueous oxidation step 11 to oxidize the iron sulphides with concurrent conversion of sulphide sulphur associated with the iron sulphides to elemental sulphur. This procedure is known in the art and is described in detail, for example, in U.S. Pat. No. 3,034,864. The pyrrhotitic material is slurried in an aqueous acid sulphate solution. About 15–20 g.p.l. of sulphuric acid is provided to initiate the oxidation reaction and supply the acid requirements of the soluble sulphate forming, non-ferrous impurities such as Cu, Ni, Co and Zn. Once the reaction is under way, sufficient acid is regenerated to carry it. The only additional acid needed is that required to compensate for mechanical losses and losses to insoluble sulphate forming impurities such as lead.

In the context of the process illustrated in the drawing, the oxidation step preferably is conducted in an agitator equipped autoclave at a temperature below the melting point of sulphur preferably between 210° F. and 230° F. and under an oxygen partial pressure above about 50 p.s.i., preferably about 100 to 130 p.s.i. Unlike the process of U.S. Pat. No. 3,034,864, the temperature preferably is not raised above the melting point of sulphur during any stage of the oxidation reaction as it is desirable to avoid occlusion of sulphides by molten sulphur in order to obtain optimum oxidation of both ferrous and non-ferrus metal sulphides.

The end product of the aqueous oxidation step 11 is a slurry comprised of a weak acid sulphate solution containing dissolved non-ferrous metals and a small amount of ferric and ferrous iron and a solids fraction containing elemental sulphur, oxidized iron compounds including hydrated ferric oxide and basic ferric sulphate, unreacted sulphides, gangue materials and, in some cases, other insolubles such as precious metals and lead (as $PbSO_4$).

According to a preferred embodiment of the present invention, iron, elemental sulphur and non-ferrous impurities are recovered from this slurry by the sequence of steps shown in the drawing following the aqueous oxidation step and identified by numerals 12 through 22.

In iron dissolution step 12 the slurry from the oxidation step 11 preferably is first diluted with water as required to adjust the solids content to about 30–40%. The slurry is reacted under non-oxidizing conditions with sulphur dioxide and sulphuric acid to convert the oxidized iron compounds in the slurry to sulphates and dissolve them in the solution. $SO_2$ and $H_2SO_4$ must be added in amount sufficient to provide the sulphur required for this conversion. The precise proportions of $SO_2$ and $H_2SO_4$ are not critical to the general operability of the iron dissolution step. However, for optimum results, the relative amounts of $SO_2$ and $H_2SO_4$ should be controlled to effect conversion of substantially all the oxidized iron values in the slurry to ferrous sulphate which is highly soluble in the solution. For this purpose, sulphur dioxide must be added in amount sufficient to reduce substantially all the three valent iron in the slurry to the 2-valent state and $H_2SO_4$ in amount sufficient to make up the balance of the sulphur required for conversion of the oxidized iron compounds to ferrous sulphate. When less than the amount of $SO_2$ required to reduce substantially all the $Fe^{+++}$ to $Fe^{++}$ is used, the unreduced iron may still be taken into solution as ferric sulphate. However, this has the disadvantages that ⅓ more sulphur is required to form the ferric sulphate than the ferrous sulphate, the 3-valent iron is less soluble than the 2-valent form thus necessitating handling of more dilute solutions and, in the subsequent hydrolysis step, an increased amount of $H_2SO_4$ is liberated and less iron is precipitated. On the other hand, where the amount of $SO_2$ is increased and the amount of $H_2SO_4$ is correspondingly decreased, the dissolution of oxidized iron and formation of ferrous sulphate still proceeds but at a much slower rate than is obtainable with proper proportioning of $SO_2$ and $H_2SO_4$. Also some ferrous sulphite is formed.

In practice, optimum results are obtained by providing about ½ mole of $SO_2$ per mole of ferric iron in the slurry together with sufficient $H_2SO_4$ to maintain the S/Fe molar ratio of the system in the range of 1.01:1 to 1.2:1.

The iron dissolution operation preferably is carried out in a corrosion resistant, sealed autoclave at a temperature up to the boiling point of the slurry and preferably at about 200° F. At this elevated temperature, the solubility of ferrous and ferric sulphate in the solution is substantially increased and up to 150 g.p.l. iron, as $FeSO_4$, can be readily taken into solution.

Treated slurry from the iron dissolution operation is passed to filtration step 13 wherein solution containing dissolved iron and non-ferrous values is separated from solid residue. The residue, which contains elemental sulphur, unreacted sulphides, gangue and insoluble sulphates and precious metals, is passed to granulation step 14. In this step, the residue is dispersed in water to yield a slurry to 30-40% solids which is heated with agitation to above the melting point of sulphur, e.g. to about 260° F., for about 15 minutes and then cooled. This results in the formation of solid sulphur pellets or granules. The sulphur granules, usually with some occluded sulphides, are separated by screening the slurry. Pure elemental sulphur is recovered from the sulphur granules by hot filtration at 300° F. (step 15). Sulphides are recycled to the thermal decomposition step. As an alternative to hot filtration, the elemental sulphur can be extracted using organic solvents such as tetralin, o-dichloro-benzene or ethylene bromide.

As a variation of the sulphur recovery procedure just described, the granulation operation can be carried out on the slurry from the aqueous oxidation operation before it is passed to the iron dissolution step. This is done simply by heating the slurry at the end of the oxidation to about 260° F. for 15 minutes and then cooling with agitation. Typical size distribution of pellets formed in this manner is: +20 mesh (Tyler)—10%, −20 +12—80%, −12— 10%. In most cases the quantity and quality of the sulphur granules formed can be improved by the addition of a small amount of surface active agent to the slurry prior to granulation. 0.1 to 0.2 g.p.l. of the following agents have been found useful: gum arabic (acacia gum), Aerofroth-73 (a trademark of American Cyanamid Company) and sulphonated fatty acid esters.

The leach solution from the iron dissolution step 12 contains substantially all the iron, zinc, nickel and cobalt present in the ore. Copper is also present, although some copper will be reduced by $SO_2$ during the iron dissolution reaction and will report in the residue in elemental form. Where the nature of the starting sulphides is such that the solution contains economically recoverable amounts of non-ferrous impurities and/or where the presence of such impurities in the iron product is unacceptable, these are removed from the solution in stripping step 16. This is accomplished by treating the solution directly with iron powder and/or a sulphidizing agent such as $H_2S$. Iron functions to neutralize the free sulphate and to cement all the elements below iron in the electromotive series, in this case, Cu, Ni and Co. Zinc is also removed from solution by the iron addition in that the iron and $H_2SO_4$ generate $H_2$ with the subsequent formation, in the presence of elemental sulphur, of $H_2S$ which precipitates dissolved zinc from solution as ZnS.

After separation of the precipitated non-ferrous impurities in filtration step 17, the solution, which normally contains 100-150 g.p.l. iron, is treated in hydrolysis step 18 to precipitate iron as basic iron sulphate according to the reaction:

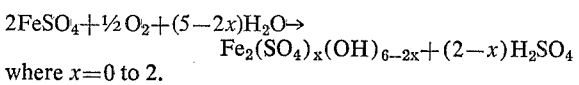

where $x=0$ to 2.

This operation preferably is conducted in a sealed reaction vessel at a temperature within the range of 375– 450° F. under an oxygen partial pressure of about 5-30 p.s.i., preferably about 20-25 p.s.i. About 1 hour is required to precipitate 70-80% of the iron from solution under optimum conditions. The basic iron sulphate precipitate is crystalline in foam and is easily separated from the solution in filtration step 19. When non-ferrous impurities are removed or at least lowered to below about 2 g.p.l. prior to hydrolysis, the iron precipitate contains less than 0.1% non-ferrous impurities. The filtrate which normally contains 30–60 g.p.l. $H_2SO_4$ and 10–45 g.p.l. iron is recycled to the iron in dissolution and aqueous oxidation steps.

The basic iron sulphate precipitate is next treated in accordance with known methods for the recovery of product iron. The method shown in the drawing involves a pelletizing step 20 followed by roasting in air in calcining operation 21. The purpose of this is to lower sulphur to an acceptable level for subsequent direct reduction to iron. Calcining is carried out in conventional equipment by heating in air at a temperature between 1200° and 1800° F., preferably at about 1400° F. Exit gas from the calcining operation consisting primarily of $SO_2$ and a small amount of $SO_3$ is recycled to iron dissolution step 12.

The calcine is reduced to pure product iron in direct reduction step 22 in accordance with known methods. In general, this is carried out by heating the calcine in contact with suitable solid and/or gaseous reducing agents at a temperature above about 1500° F. and preferably at about 1900° F.

The process of this invention may be utilized for treating any type of iron sulphide ores, independent of the level of impurities. The flow sheet shown in the drawing permits the treatment of pure or contaminated pyrite— producing a high purity iron suitable for direct moulding and powder metallurgy applications. Such impurities as copper, zinc, nickel and cobalt are extracted in the aqueous oxidation and $SO_2$-$H_2SO_4$ iron dissolution steps and are removed from the circuit as by-products in the stripping step. The lead, precious metals and other insolubles remain quantitatively in the residue from the iron dissolution step and constitute another by-product from which lead and precious metals may be readily recovered.

In treating iron sulphides which do not contain economically recoverable quantities of non-ferrous impurities or where non-ferrous impurities are not objectionable in the iron product, the stripping step may be eliminated from the flow scheme. Also, of course, sulphides already in pyrrhotitic form, such as naturally occurring pyrrhotite or iron matte, would be treated directly in the aqueous oxidation step.

The improved process of this invention possesses a number of important advantages. Among them: flexibility which permits treatment of a wide range of iron sulphide ores and concentrates; the process is self-sustaining requiring no reagents other than air, water, reductants and energy; impurities present in the iron ore are recovered as by-products; sulphur is recovered in elemental form, partly requiring purification from arsenic and selenium and partly as a high purity elemental sulphur. Finally, high recovery of all valuable constituents in the ore is obtained, e.g. Fe—+98%, S°—90%, Cu, Zn, Ni, Co—+95%, Pb and precious metals—100%.

The invention is illustrated and further explained by the following example.

EXAMPLE 1

The head material for this example was a slurry derived from aqueous acid oxidation of thermally decomposed pyrite. The analyses of the pyrite before and after thermal treatment and the oxidation end slurry are shown in Table 1.

TABLE 1.—COMPOSITION

| Material | Wt. percent in solids, g.p.l. in solution | | | | | | | | Oz./T |
|---|---|---|---|---|---|---|---|---|---|
| | Fe | S | Zn | Pb | As | Co | Cu | Insol | Ag |
| Pyrite: | | | | | | | | | |
| Before thermal treatment | 43.1 | 50.5 | 2.19 | 6.4 | 0.4 | 0.045 | 0.31 | 1.0 | 1.76 |
| After thermal treatment [1] | 55.1 | 36.5 | 2.76 | 1.46 | 0.003 | 0.052 | 0.38 | 1.4 | 2.37 |
| Oxidation end slurry,[2] solution | 17.3 | 17.8 | 4.1 | 0.01 | | 0.19 | 1.28 | | 0 |
| Residue: | | | | | | | | | |
| Elemental S fraction (+100 mesh)[3] | 6.9 | {89.8 / 81.9(S°)} | 1.6 | 0.27 | | 0.007 | 0.2 | | 0.43 |
| Iron oxide fraction (−100 mesh) | 47.2 | {7.6 / 1.7(S°)} | 0.29 | 1.78 | | 0.015 | 0.17 | | 1.98 |

[1] Thermal decomposition conditions: dead roasting at 1,500° F. for 30 minutes in flowing atmosphere composed of 70% $N_2$, 10% $CO_2$, 20% $H_2O$ (by volume).
[2] Aqueous oxidation conditions: 230° F., 150 p.s.i. $O_2$ partial pressure, 1 hour oxidation period, initial solution composition, 20 g.p.l. $H_2SO_4$, 10 g.p.l. $Fe^{+++}$, 12 g.p.l. $Fe^{++}$.
[3] Elemental sulphur recovery conditions: Heat oxidation end slurry to 260° F. with agitation for 15 minutes, cool slurry and screen through 100 mesh standard Tyler screen.

A sample of oxidation end slurry with the +mesh elemental sulphur fraction removed by screening and which contained about 1100 gms. of solids and 1460 ml. of solution was diluted with about 3200 ml. of water and charged into an autoclave. 5.5 moles of $H_2SO_4$ (0.61 mole per mole of Fe in the slurry) were added to the charge and the autoclave sealed and heated to 200° F. The slurry was agitated continuously and 4.5 moles of $SO_2$ (0.5 mole per mole of Fe) were injected into the autoclave over a 10 minute interval. After 2 hours, the autoclave was cooled and the contents discharged. The amounts and analyses of the products are shown in Table 2.

TABLE 2

| | Material | |
|---|---|---|
| | Leach residue | Leach solution |
| Quantity | 120 gms. | 4,860 ml. |
| Percent by weight: | | |
| Fe | 13.3 | 106 |
| Fe++ | | 101 |
| S | 27.1 | |
| S° | 16.7 | |
| Cu | 0.76 | 0.12 |
| Zn | 0.12 | 0.49 |
| Ni | 0.021 | 0.14 |
| Co | 0.004 | 0.045 |
| Pb | 23.5 | |
| $H_2SO_4$ | | 27 |
| Insol | 28.8 | |
| Ag | 25.3 oz./T | |

One 4 litre sample of the leach solution was treated at 200° F. with 40 ml. $(NH_4)_2S$ solution and 66 gms. of iron powder and another 4 litre sample with iron powder only. In each case, the samples were agitated with the added reagents for 30 minutes and then filtered. The results are shown in Table 3.

TABLE 3

| Reagent | Product | Quantity | Analysis, wt. percent in solids, g.p.l. in solutions | | | | | | |
|---|---|---|---|---|---|---|---|---|---|
| | | | Fe | S | Cu | Zn | Ni | Co | pH |
| | Head soln., ml | 4,000 | 106 | | 0.12 | 0.49 | 0.14 | 0.05 | 1.1 |
| 66 gm. Fe plus 3.12 gm. S⁻ | Purified soln., ml | 3,910 | 114 | | <0.001 | <0.005 | <0.001 | <0.001 | 5.5 |
| | Strip residue, gm | 69 | 35 | 16.1 | 0.9 | 2.8 | 1.0 | 0.2 | |
| 66 gm. Fe | Purified soln., ml | 3,920 | 112 | | <0.001 | <0.005 | <0.001 | <0.001 | 2.1 |
| | Strip residue, gm | 15 | 20 | 30.6 | 3.8 | 13.8 | 3.9 | 0.9 | |

3910 ml. of the purified solution were heated at 400° F. for 1 hour under 20 p.s.i. oxygen partial pressure to hydrolyze dissolved iron and precipitate it from solution. 3050 ml. of hydrolysis end solution were recovered together with 740 grams of iron precipitate analyzing (wt. percent) 37.7% Fe, 15.7% S, <0.001% Cu, Ni, and Co and <0.005% Zn.

Hydrolysis of the same solution but without purification first produced an iron precipitate analyzing (wt. percent) 36.7% Fe, 16.7% S, 0.03% Cu, Zn and Ni and 0.02% Co.

A sample of the high purity iron precipitate was calcined by heating in air at 1400° F. for 30 minutes and then reduced to metallic iron by heating at 2000° F. for 30 minutes in contact with hydrogen. The final product was a high purity iron powder having the following analysis (wt. percent): 0.0076 S, 0.0065 C, 0.14 $O_2$, 0.003 Cu, <0.005 Zn, 0.001 Ni, <0.001 Co, <0.001 Pb, 0.005 As, 0.003 Se, <0.008 Al, 0.003 Si and <0.001 Ag, balance Fe.

What we claim as new and desire to protect by Letters Patent of the United States is:

1. In the method of treating iron sulphides to produce elemental sulphur including an aqueous oxidation operation in which a slurry of finely divided pyrrhotitic mineral sulphides in aqueous media is treated at a temperature below about 245° F. with a free oxygen bearing gas to convert iron values in the sulphides to oxidized iron compounds with concurrent conversion of sulphide sulphur associated with the iron values to elemental sulphur and said elemental sulphur is recovered, the improvement in combination therewith for also recovering the iron content of the mineral sulphides which comprises: subjecting slurry from the aqueous oxidation operation to an iron dissolution operation in which said slurry is reacted under non-oxidizing conditions with sulphuric acid and sulphur dioxide to convert the oxidized iron compounds contained in the solids fraction of the slurry to sulphates and dissolve them in the solution, separating the solution with dissolved iron sulphates from undissolved residue, heating the solution under oxidizing conditions to hydrolyze and precipitate dissolved iron from solution as basic iron sulphate, recovering the basic iron sulphate precipitate.

2. The process according to claim 1 wherein in the iron dissolution operation, sufficient sulphur dioxide is provided to reduce substantially all 3-valent iron in the slurry from the aqueous oxidation operation to 2-valent form and sufficient sulphuric acid is provided to ensure that at least one mole of sulphur is available in the slurry for each mole of iron.

3. The process according to claim 2 wherein the iron dissolution operation is carried out at a temperature of about 200° F.

4. The process according to claim 2 wherein about one-half mole of sulphur dioxide is provided per mole of ferric iron in the slurry, together with sufficient sulphuric acid to maintain the sulphur to iron molar ratio of the slurry in the range of 1.0:1 to 1.2:1.

5. The process according to claim 1 wherein the iron sulphides contain non-ferrous metal values which are taken into solution in the oxidation operation and prior to the hydrolysis step, the solution is reacted with metallic iron, a sulphidizing agent or both to selectively substantially remove said non-ferrous metal values therefrom.

6. The process according to claim 1 including the step of separating elemental sulphur from the aqueous oxidation slurry prior to the iron dissolution operation by heating said slurry, with agitation, to above the melting point of sulphur for a short period of time to cause formation of elemental sulphur globules, cooling the slurry to form solid sulphur pellets and recovering the sulphur pellets.

7. The process according to claim 6 wherein about 0.1 to 0.2 g.p.l. of a surface active agent selected from the group consisting of gum arabic and sulphonated fatty acid esters is added to the slurry prior to heating to form sulphur globules.

8. The process according to claim 1, including the step of separating elemental sulphur from the undissolved residue from the iron dissolution step by heating and agitating a slurry of the residue to a temperature above the melting point of sulphur to agglomerate the elemental sulphur into liquid sulphur globules, cooling the slurry to a temperature below the melting point of sulphur to form solid sulphur pellets and recovering the solid sulphur pellets from the slurry.

9. The process according to claim 1 wherein the iron hydrolyzing step is carried out at a temperature within the range of 375–450° F. under a partial pressure of oxygen of about 5–30 p.s.i.

10. The process according to claim 1 wherein the basic iron sulphate is pelletized and then roasted and off-gases from roasting including sulphur dioxide are re-cycled to the iron dissolution step.

11. The process according to claim 10 wherein calcine from the roasting step is contacted with a reducing agent at a temperature above about 1500° F. to produce substantially pure iron product.

12. The process for treating pyrite containing non-ferrous metal impurities including at least one metal selected from the group consisting of copper, zinc, nickel, cobalt, and precious metals which comprises the steps of thermally decomposing the pyrite to drive off labile sulphur and produce an artificial pyrrhotite having a sulphur to iron molar ratio between 1.0 and 1.5; slurrying the thermally decomposed pyrite in an aqueous acid sulphate solution containing at least sufficient sulphuric acid to combine stoichiometrically with the non-ferrous metal impurities as sulphates; agitating the slurry at a temperature in the range of about 200 to about 230° F. under a partial pressure of oxygen above about 50 p.s.i. to convert iron sulphides to oxidized iron compounds and elemental sulphur; reacting slurry containing said oxidized iron compounds under non-oxidizing conditions and sulphuric acid and sulphur dioxide provided in amounts sufficient to convert said iron compounds to sulphates and dissolve them in the solution fraction of said slurry; separating the solution with dissolved sulphates from the solid fraction of the slurry; treating said solution to selectively precipitate non-ferrous metal values therefrom; separating precipitated non-ferrous values and heating the solution under oxidizing conditions to hydrolyze and precipitate dissolved iron from solution as basic iron sulphate and recovering the basic iron sulphate precipitate.

References Cited

UNITED STATES PATENTS

| | | | |
|---|---|---|---|
| 2,130,278 | 9/1938 | Keyes | 75—115 |
| 3,088,820 | 5/1963 | Mackiw et al. | 75—117 |

L. DEWAYNE RUTLEDGE, Primary Examiner

W. W. STALLARD, Assistant Examiner

U.S. Cl. X.R.

23—126; 75—117